Aug. 19, 1930.  T. A. MITCHELL  1,773,235
TWO-STAGE METHOD OF CHLORINATING ORES
Filed April 6, 1927
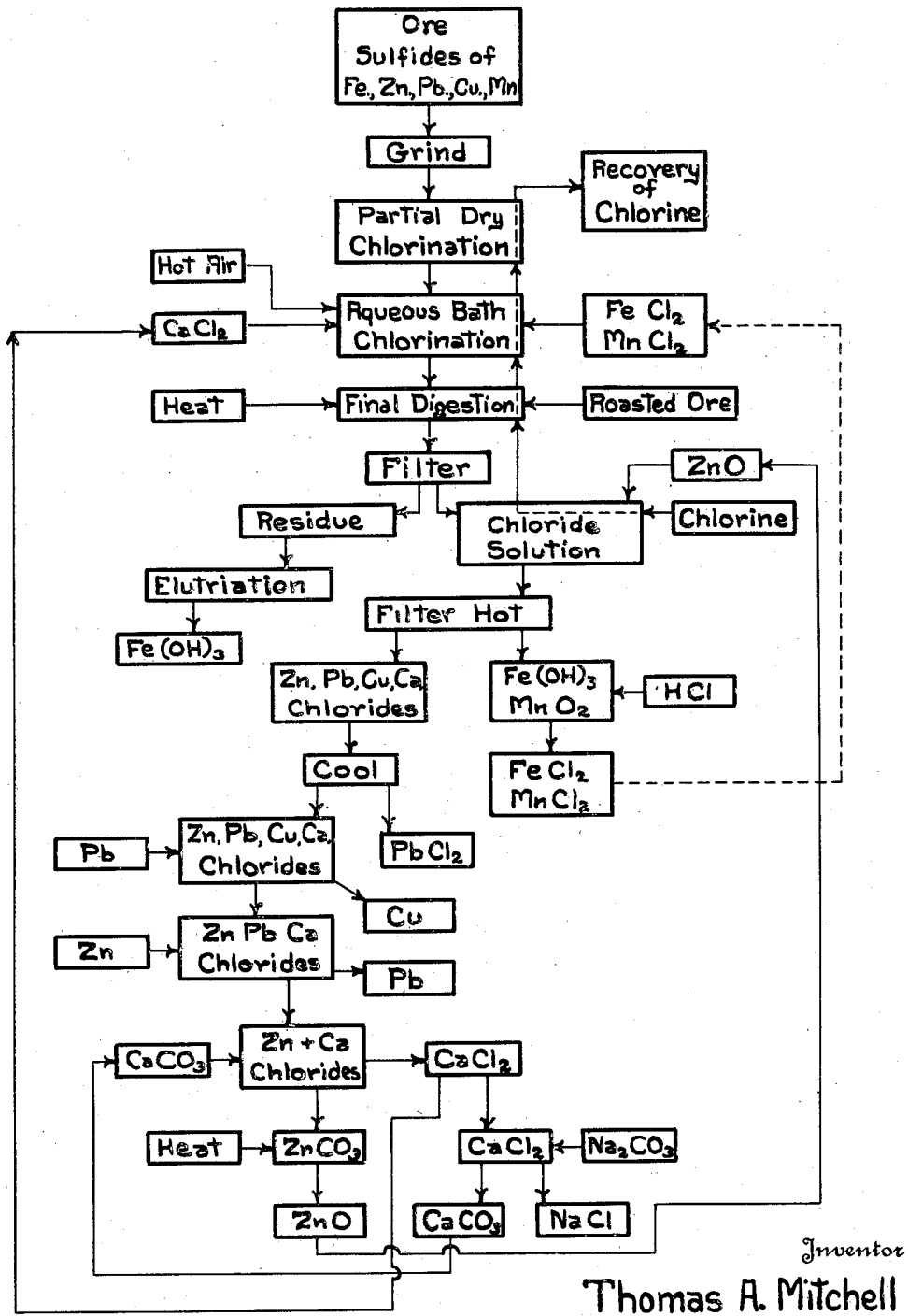
Inventor
Thomas A. Mitchell Patented Aug. 19, 1930

1,773,235

UNITED STATES PATENT OFFICE

THOMAS AUSTIN MITCHELL, OF DENVER, COLORADO, ASSIGNOR TO LAFAYETTE M. HUGHES, OF DENVER, COLORADO

TWO-STAGE METHOD OF CHLORINATING ORES

Application filed April 8, 1927. Serial No. 181,610.

This invention relates to methods of treating complex ores containing the compounds of valuable metals and more particularly to the treatment of a complex sulfide ore.

The complex sulfide ores ordinarily contain iron pyrites. It has been proposed to use a ferric chloride solution in the presence of the chlorine gas to convert the valuable ore metal sulfides to chlorides, but the iron sulfide in the ore is not attacked to any considerable extent by this method.

One object of the present invention is to convert iron pyrites in such an ore into a chloride, and particularly to obtain the ferric chloride reagent from the iron content of the ore itself by a preliminary selective chlorination step, and further to so carry on the subsequent process that the iron chloride thus formed may serve efficiently as a chlorinating reagent and then be removed from the bath, when it has served its purpose, so that it will not detrimentally affect the other stages of the process.

In the course of my experimentation, I have discovered that manganese chloride is a highly efficient reagent for chlorinating a sulfide ore, hence a further object of my invention is to provide a method whereby manganese chloride may be employed in combination with other agents to effect the chlorination of the ore metal sulfides, and then be removed from the bath and preferably before the ore metals are recovered.

The invention has for a further object the employment of such reagents and steps that the ore treatment may be substantially continuous and cyclic in its operation, so that the reagents may be recovered for further use, if desired, and so that the process may be economical, simple and efficient and not require complex or unnecessary steps for removing foreign ingredients from the bath.

With these and other objects in view as will be apparent in the following disclosure, my invention resides in the combination of steps set forth in the specification and covered by the claims appended hereto.

In accordance with my invention, I have provided a method suitable for recovering valuable products from an ore, which may be a complex ore made up largely of sulfides of valuable metals intertwined and intermixed with one another and with various impurities, such as silica, or the ore may comprise oxides and carbonates of the metals or any combination of such compounds. My invention broadly contemplates chlorinating the ore in two separate stages to form chlorides of different ingredients of the ore separately, and in this two stage process, I propose to treat the ore first to a non-aqueous partial chlorination, and then subsequently subject the partially converted ore to the action of a chlorinating reagent in an aqueous bath. The preferred reagent for the first stage is chlorine gas and the ore thus treated may be dry or moistened with water, but the treatment is essentially a dry one. For the second stage, I prefer to employ a chloride of a metal capable of reducing from a higher to a lower valence and of reacting with other compounds of the ore. Examples of such reagents are ferric, manganic and cupric chlorides.

The common types of ore contain iron, copper or manganese generally as sulfides as well as sulfates and carbonates, and, as stated, the higher chlorides of these metals of more than one valence have the capacity of chlorinating the sulfides of various other metals in the ore. A further feature of my invention therefore involves preliminarily treating the ore in such a manner as to chlorinate it partially and form a chloride of such a reagent metal already present in the ore and then using it to chlorinate the other ingredients of the ore. In particular, I propose to extract a portion of the iron content of the ore as a chloride and to oxidize it to the higher form, after which it may be employed to attack the sulfides of lead, zinc and the like which are present in the ore. This ferric chloride may be used alone or in combination with the chlorides of such metals as manganese and copper. Manganic chloride is preferred as a reagent in the second stage since it is able to attack the sulfides of zinc, lead and other metals rapidly and with the evolution of heat. Hence, if manganese is not present in the ore, a small amount of the chloride is added to either stage of the process. In order that the process may be continuous, the lower chloride formed during the final chlorination stage may be regenerated to the higher form by an oxidizing medium. For this purpose I preferably utilize chlorine gas, so that this gas may be passed from the second stage wet process to carry on the first stage dry chlorinating action.

Referring to the drawing, I have there illustrated one arrangement of steps which may be used to treat a complex sulfide ore. Such an ore may contain a mixture of sulfides of various metals, such as silver, copper, lead, zinc, iron, manganese and the like. The ore should be first crushed to a fine size, and if desired the valuable ingredients of the ore may be concentrated, but no attempt is made at separating the various values one from another. My invention particularly contemplates a dry chlorination without an initial separation of the concentrates, zinc and lead, as is ordinarily required by present day smelter methods. This finely divided ore containing its mixture of sulfides, either concentrated or not, and which may be dry or moist, is passed through a dry chlorinating apparatus, such as a rotary drum, and in which it is agitated while subjected to the action of chlorine gas passing as a countercurrent through the drum. The chlorine gas is ordinarily obtained from a latter step in the process, and this arrangement provides for an economic utilization of this reagent. This dry chlorination treatment, which includes having the ore moist or dry, results mainly in the formation of iron chloride, as well as some chlorides of the more valuable ingredients of the ore.

The partially chlorinated ore is then passed to a digesting apparatus where it is treated in aqueous bath, in the particular example given, with ferric and manganic chlorides. The reaction with these chlorides may be considered to take place in accordance with the following equation, considering only the ferric chloride and the zinc sulfide present in the ore, and without reference to possible minor secondary reactions.

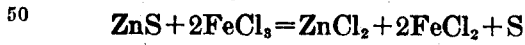

$$ZnS + 2FeCl_3 = ZnCl_2 + 2FeCl_2 + S$$

If an iron compound is present in the original ore, then it will be understood that this reagent is preferably obtained from the ore itself in the dry chlorinating operation. Likewise, if manganese compound is present in the ore and enough chloride is formed by the dry chlorination, no further manganese chloride need be added, but if necessary I may add this reagent at either stage of the process. If desired, however, the chlorides formed initially may be removed from the ore and new reagents employed in the second stage chlorination. However, to render the process continuous and efficient and to make use of the ingredients actually present in the ore, I prefer merely to pass the dry chlorinated ore into an aqueous bath to dissolve the iron and manganese chlorides present and to oxidize them to the higher condition, whereupon they immediately react with the zinc and other sulfides of the ore to form chlorides thereof.

To make the process continuous, a suitable oxidizing reagent is introduced into the bath to oxidize the lower chlorides formed by reduction of the reagents in the second stage process as well as any chlorides present in the partially chlorinated ore, so that they may make a further attack upon the unconverted desired metal sulfides of the ore. For this purpose, I prefer to utilize chlorine gas, since the surplus of the gas is then available for the dry chlorinating treatment. It should be understood that the ferric and manganic chlorides need be present only in small amounts and low concentration, and that they serve as carriers of chlorine from the gas introduced to the ore compounds. This low concentration may be simply obtained by suitably proportioning the water to the amount of soluble reagent, as will be readily understood.

As there may be sulfates present in the ore due to surface oxidation, this digesting operation is also preferably carried on in the presence of a soluble chloride such as calcium or sodium chloride, which may react therewith to form chlorides. This soluble salt will also serve as a cyclic carrier of chlorine, throughout various steps of the process so that it may be finally recovered and returned for reuse if desired. I preferably use calcium chloride for this purpose, since it has the power of helping to keep silver chloride in solution. The calcium chloride, as well as the reagent chlorides may be obtained from the wash waters or from the solutions derived later in the process.

The digestion of the ore is aided by heat, but since there is free sulfur present which, if melted or softened by the heat may coat the ore particles and prevent the chlorine from coming fully into contact with it, I find it desirable to maintain the temperature of the bath below the melting point of the sulfur and preferably just below the boiling point of the solution. In order to avoid diluting the bath I prefer that the thermal supply be air, the temperature of which is suitably regulated as is found desirable, due account being given to the exothermic reaction between the manganic chloride and the ore metal sulfides.

The solution contains not only the desired ore chlorides but the iron and manganese chloride reagents as well, and it is preferable to remove the iron and manganese at this stage. This is best done by precipitating the major portion of the iron first preferably as a hydroxide, and then removing the manganese with the remainder of the iron. The digestion may be carried on in several stages, and in the final stage, either before or after filtering off the ore residue, I may introduce an oxide, such as zinc oxide, or preferably a batch of the ore which has been previously roasted, so that this material in the presence of the chlorine gas may precipitate the iron compounds as hydroxide. This is preferably done before filtering, to avoid the corrosive effect of large amounts of ferric chloride on the filter medium.

Upon filtering the residue from the solution, it is found that the solution contains the chlorides of the various valuable metals in the ore, and the residue contains silica, free sulfur, ferric hydroxide and the unattacked pyrites.

There ordinarily remains some iron and manganese compounds in the filtrate, and this is finally purified by adding zinc, lead or other oxide and passing chlorine through the solution. This may be done also by adding bleaching powder to the solution. As a result ferric hydroxide and manganese dioxide are precipitated and may be removed by filtering. These may be treated with hydrochloric acid to form chlorides, and the product returned to the wet chlorinating tank if more reagent is needed. Some of the iron hydroxide first thrown out may, if needed, be removed by elutriation and treated with hydrochloric acid to form a chloride and this be returned to the chlorination bath.

The solution of the chlorides of silver, lead, zinc, copper and calcium, together with some soluble calcium sulfate and other impurities, which has been maintained hot to this point, is then cooled to precipitate the lead chloride, and any insoluble impurities such as calcium sulfate, which may be filtered off. Thereafter, the remaining lead and copper may be removed in any suitable way, such as by passing the solution successively over fragments of copper to precipitate silver, if any is present, then over lead to throw out the copper, then over zinc to form sponge lead. The resulting solution is made up largely of zinc and calcium chlorides.

By adding calcium carbonate powder to this solution I am able to remove the zinc as an insoluble carbonate. I find that the reaction proceeds in accordance with the following formula:

$$ZnCl_2 + CaCO_3 = CaCl_2 + ZnCO_3$$

In this step, I may keep the $ZnCl_2$ in excess so that there will be too little calcium carbonate for a complete reaction. The zinc chloride which remains in solution with the calcium chloride may be recovered by adding sodium carbonate to the solution, and returning the two precipitated carbonates of calcium and zinc to the tank in which the zinc chloride is first treated with calcium carbonate. However, in the process illustrated this is shown as a simple case of precipitating all of the zinc carbonate in the first step. By filtering off the zinc carbonate, I thereby separate the calcium chloride solution which may be then returned to process to aid in further solution of the values of the sulfide ore. The zinc carbonates thus obtained may be treated as desired to obtain values therefrom. In the present case I roast some of the zinc carbonate to form the oxide and return this to purify the chloride solution of iron and manganese. If desired, I may treat some of the $CaCl_2$ solution with sodium carbonate to form calcium carbonate for use in precipitating the zinc carbonate. The sodium chloride thus formed may be used in the chlorination bath or as a source of chlorine, or otherwise disposed of.

By the present process, I utilize the chlorine which escapes from the digesting apparatus and absorb a considerable portion of it in chlorinating the mixed sulfide ore in a comparatively dry condition. This chlorine is trapped as it comes from the aqueous bath and therefore can be run rapidly through the wet end of the process with greater efficiency of operation. My method does not result in the formation of undesired sulfates or in the loss of the expensive chlorine gas, and by this process I find it feasible and simple to convert the major portion of the values to easily recoverable chlorides. The reagents employed are cheap and easily obtainable and in fact the chief reagent in the wet chlorination is ordinarily obtained from the ore itself. By providing a suitable source of chlorine, I am enabled to carry out the process continuously and effectively and with a minimum of expense. It will be understood that various modifications may be made in this process within the skill of one acquainted with the chemistry and treatment of metallurgical ores. It will also be understood that any reference in the claims to the ore should be interpreted as covering the ore in various conditions and after it has been subjected to preliminary treatments such as crushing or concentrating the fines.

Having thus described my invention what I claim as new and desire to secure by Letters Patent is:

1. The method of treating a complex sulfide ore comprising the steps of chlorinating the ore in a substantially dry condition with chlorine gas, thereafter digesting the ore in an aqueous solution containing manganese chloride and calcium chloride while passing chlorine gas into the bath.

2. The method of treating a complex sulfide ore comprising the steps of partially chlorinating the substantially dry ore with chlorine gas, digesting the mass in an aqueous solution of the ore metal chlorides and manganese chloride while passing chlorine gas into the bath, and subsequently separating the ore metal values therefrom.

3. The method of treating a complex sulfide ore containing iron sulfide comprising the steps of first partially chlorinating the substantially dry ore with chlorine gas to form iron chloride, and thereafter introducing the partially chlorinated material into an aqueous bath and digesting it with its soluble chlorides and manganese chloride in the presence of chlorine gas, precipitating iron and manganese compounds from the solution, separating said precipitates and the ore residue from the solution and thereafter recovering the ore metal values.

4. The method of treating a complex sulfide ore containing iron sulfide comprising the steps of chlorinating the pulverized ore in a substantially dry condition with chlorine gas to form iron chloride, digesting the chlorinated mass in an aqueous solution of the soluble chlorides of the chlorinated mass while passing chlorine gas into the solution, then prior to filtering treating the solution in the presence of chlorine gas with a compound of a metal present in the mass to precipitate an iron compound, thereafter filtering and separating the iron compound from the solution and subsequently recovering ore metal values from the solution.

5. The method of treating a complex sulfide ore containing iron sulfide comprising the steps of partially chlorinating the ore in a substantially dry condition with chlorine gas, digesting the chlorinated mass in an aqueous solution of the ore metal chlorides and manganese chloride while passing chlorine continuously into the bath, treating the solution with an oxide of an ore metal in the presence of chlorine gas, separating the precipitated iron and manganese compounds and the residue from the solution of ore metal chlorides, and thereafter recovering ore metal values therefrom.

6. The method of treating a complex sulfide ore containing iron and zinc sulfides comprising the steps of partially chlorinating the ore in a substantially dry condition with chlorine gas to form iron chloride, dissolving the soluble salts of the chlorinated ore in water to produce a dilute solution of iron chloride, digesting the ore with said solution in the presence of chlorine gas and calcium chloride, precipitating the iron prior to filtering the solution while leaving zinc and calcium chlorides therein and thereafter filtering and treating the solution to recover the zinc.

7. The method of treating a complex sulfide ore containing iron sulfide comprising the steps of partially chlorinating the substantially dry ore with chlorine gas, digesting the chlorinated ore in an aqueous bath containing a carrier of chlorine ions and a low concentration of iron and manganese chlorides while passing chlorine gas continuously into the solution, thereafter precipitating and separating the iron and manganese compound from the solution, and then recovering the ore metal values.

Signed at Newark, New Jersey, this 31st day of March, 1927.

THOMAS AUSTIN MITCHELL.